United States Patent
Duszynski

(10) Patent No.: US 8,044,337 B2
(45) Date of Patent: Oct. 25, 2011

(54) PORTABLE CONTAINER MOUNTED COUNTER FOR FISHING, HUNTING, AND OTHER OUTDOOR ACTIVITIES

(76) Inventor: Gary J. Duszynski, Delavan, WI (US)

(*) Notice: Subject to any disclaimer, the term of this patent is extended or adjusted under 35 U.S.C. 154(b) by 0 days.

(21) Appl. No.: 11/837,194

(22) Filed: Aug. 10, 2007

(65) Prior Publication Data

US 2009/0039238 A1    Feb. 12, 2009

(51) Int. Cl.
*G06M 7/00* (2006.01)
(52) U.S. Cl. ............................... 250/221; 377/6
(58) Field of Classification Search .......... 250/221, 250/222.2, 203.7, 548, 559.01, 559.12, 559.4, 250/206, 214 R, 222.1, 573, 239; 377/6, 377/10, 44, 7, 9, 45, 49–53, 55, 56; 340/673, 340/674
See application file for complete search history.

(56) References Cited

U.S. PATENT DOCUMENTS

| | | | | |
|---|---|---|---|---|
| 3,040,980 A | * | 6/1962 | Mann et al. | 377/6 |
| 3,176,267 A | * | 3/1965 | Bolton | 340/932.2 |
| 3,383,517 A | * | 5/1968 | Spiller et al. | 250/221 |
| 3,584,226 A | * | 6/1971 | Lerner | 250/222.1 |
| 3,927,400 A | * | 12/1975 | Knepler | 377/6 |
| 4,031,362 A | * | 6/1977 | Brugger et al. | 377/19 |
| 4,046,996 A | | 9/1977 | Williams et al. | |
| 4,157,468 A | * | 6/1979 | Primiano | 377/10 |
| 4,333,096 A | * | 6/1982 | Jenkins et al. | 340/684 |
| 4,347,438 A | * | 8/1982 | Spielman | 250/221 |
| 4,396,828 A | * | 8/1983 | Dino et al. | 377/6 |
| 4,507,557 A | * | 3/1985 | Tsikos | 250/341.7 |
| 4,545,062 A | * | 10/1985 | Pray | 377/6 |
| 4,580,280 A | | 4/1986 | Hetrick | |
| 4,743,742 A | | 5/1988 | Espedalen | |
| 4,877,954 A | * | 10/1989 | Neuman et al. | 250/222.2 |
| 5,003,169 A | * | 3/1991 | Sakaguchi et al. | 250/221 |
| 5,110,008 A | * | 5/1992 | Moulding et al. | 221/259 |
| 5,156,291 A | | 10/1992 | Mielke | |
| 5,650,609 A | * | 7/1997 | Mertins et al. | 250/222.2 |
| 5,768,327 A | * | 6/1998 | Pinto et al. | 377/10 |
| 5,883,383 A | * | 3/1999 | Dragne | 250/222.2 |
| 5,918,739 A | * | 7/1999 | Bilof et al. | 206/366 |
| 5,941,016 A | | 8/1999 | Welcher | |
| 6,201,848 B1 | * | 3/2001 | Brancato | 377/6 |
| 6,809,658 B1 | | 10/2004 | Lofaso | |
| 6,880,485 B2 | | 4/2005 | Massey et al. | |

FOREIGN PATENT DOCUMENTS

FR    2634573 A1    1/1990

* cited by examiner

*Primary Examiner* — Que T Le
*Assistant Examiner* — Jennifer Bennett
(74) *Attorney, Agent, or Firm* — Gehrke & Associates, SC; Lisa M. Gehrke

(57) ABSTRACT

A device for electronically and optically counting objects, such as fish, animals, vegetation or other materials, as they are placed into a container. The device surrounds a defined opening on a container. As objects are placed into the container, they fall through the frame of the opening. A light source, such as a laser or LED, is directed toward a light detector in such a way as to be disrupted as the animal falls into the container. A light detector detects said disruption of the light and signals the electronic circuit to add to the number previously counted. Various methods of communicating the count are provided. The preferred method of communicating the count is via an integrated visual display. The preferred method of powering the device is by the use of one or more electric battery. Various methods of electrically powering the device are provided.

7 Claims, 5 Drawing Sheets

PORTABLE CONTAINER MOUNTED COUNTER FOR FISHING, HUNTING, AND OTHER OUTDOOR ACTIVITIES

BACKGROUND OF THE INVENTION

1. Field of Invention

This invention relates to counters for fishing, hunting or camping.

2. Discussion of Relevant Prior Art

As any experienced outdoorsman knows, keeping track of the number of animals one has caught while fishing, hunting or otherwise collecting materials can be important. Aside from a general desire to know how many animals one has caught, often, there are legal limits on the number of animals a person may harvest. It can be difficult over a long period of time to accurately recall the number of animals caught and retained, especially when some are released and not retained. As more animals are caught and retained, manually counting becomes increasing difficult, as the animals, if alive, are moving.

While there are existing devices for counting fish, these devices are deficient in many ways. For instance, there are fish counters designed to count fish in a large-scale commercial setting like fish farming or bait stores. These counters are not designed to be portable and typically require that the fish be a fairly uniformed size since these systems often require the fish to swim or be moved past a detector in a tube or channel. These fish counting systems are relatively complex and are not designed to provide portable counting.

There are some portable fish counters that rely upon a mechanical trigger for the counting system. However, counting systems that demand that a fish be forced to trigger the counter by physical contact with a flap or paddle do not address the variety of sizes one may encounter while fishing and the slippery and agitated state of a fish when caught. A fish that is thrashing and trying to return to the water may take advantage of this physical contact to push itself and resist retention. An optical counter allows the fish to be dropped into the container without touching anything that could impede its downward movement.

There are fish counters designed to be placed on a cooler. However, these counters are not automatic and require that a button be pressed to account for each fish placed in the container. This system is inconvenient for the fisherman and open to inaccuracies if he or she forgets whether the button has been pushed.

BRIEF SUMMARY OF THE INVENTION

The present invention is directed to a portable counter. It is object of this invention to provide a portable device for counting harvested or captured objects such as fish, fowl, vegetation or other materials and to provide a fast, reliable, and accurate device for counting animals as they are placed in a container and to communicate to the user the number thereof retained in the container. The forgoing object is met, in accordance with the present invention, by the provision of a device that monitors light, which is interrupted when an object, such as an animal, is dropped through the light. The interruptions are in turn counted and relayed to the user.

Accordingly, it is the object of this invention to automatically count objects such as fish, animals, vegetation or other materials as they are placed into a portable container, such as a cooler or live well on a boat.

The foregoing and other objects and advantages of the invention will be set forth in or will be apparent from the following description and drawings.

DETAILED DESCRIPTION OF THE INVENTION

The following description of preferred embodiments is merely exemplary in nature and is in no way intended to limit the invention, its application or uses.

The portable counter is comprised of at least one light source, at least one light detector, a flexible cable containing electrical wiring or optical fibers, an electronic counting circuit, an electric power source external power source connector, and a housing to contain and protect the device. In an alternative embodiment, the flexible cable is replaced by a rigid frame to better stabilize the device and to allow integration of the device with a flat rigid sheet or container lid.

Figure 1:
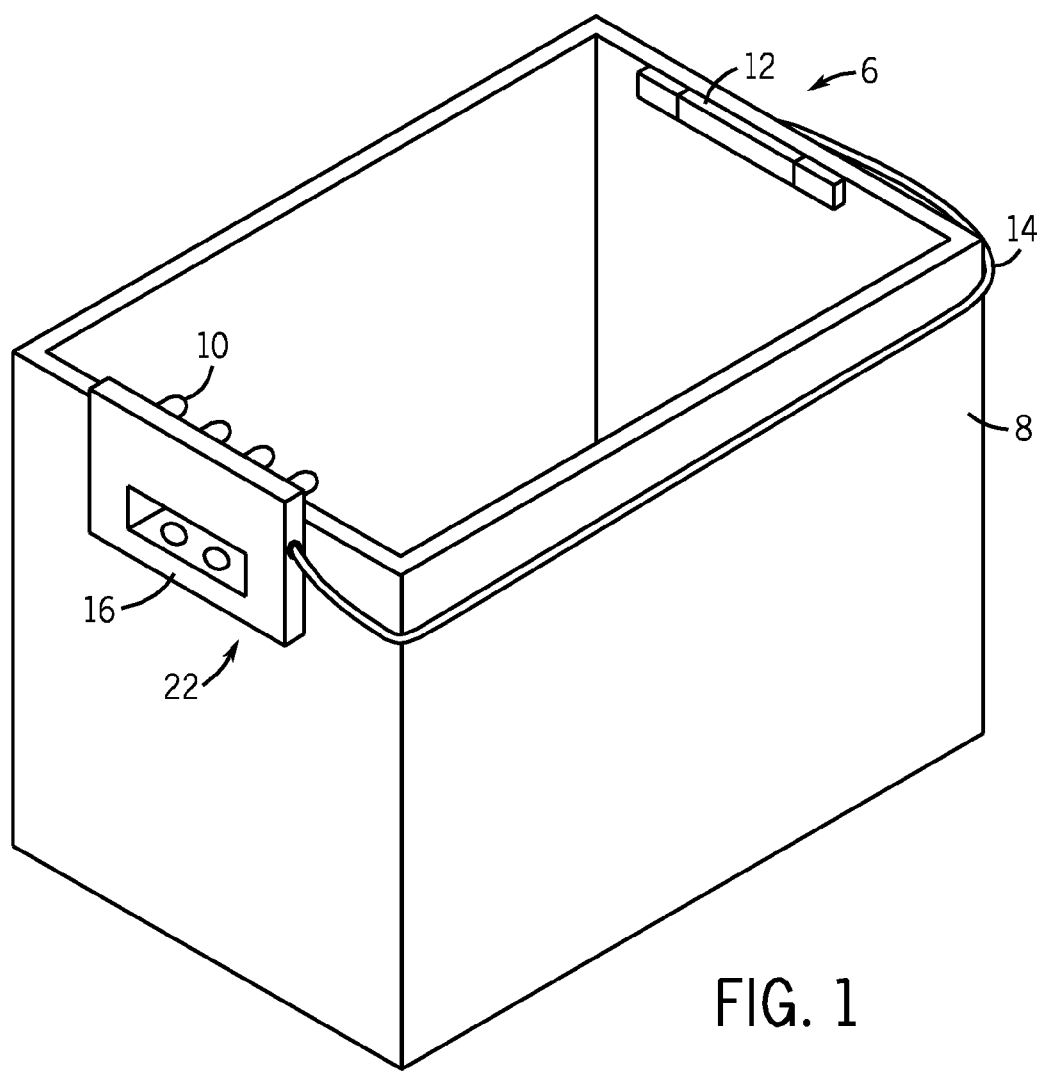
FIG. 1 is a view of the counter as mounted on the edge of an open container.

As shown in FIG. 1, the portable counter (6) is mounted on the opening of a container (8) in such a position as to allow the light from the light source (10) to transmit across the container opening and be detected by at least one light detector (12). Each light source (10) and light detector (12) must be attached to a semi-rigid to rigid surface to prevent excessive movement and maintain functioning orientation. In the preferred embodiment, the light detector (12) is connected to the remainder of the portable counter (6) by a flexible cable (14) containing all the necessary communication wiring or fiber optics. The electric power source is contained in the housing (22).

The light source (10) for the device is an electrically powered light emitter. The light emitted must be of a wavelength as to allow detection in ambient light conditions, or modulated in such a way as to allow detection in ambient light conditions. It is desirable that power consumption of the light source (10) be low so as to allow the device to operate over long periods of time. Although other types of light sources may function, it is anticipated that the device would utilize light-emitting diode(s) or laser diode(s).

Figure 2:
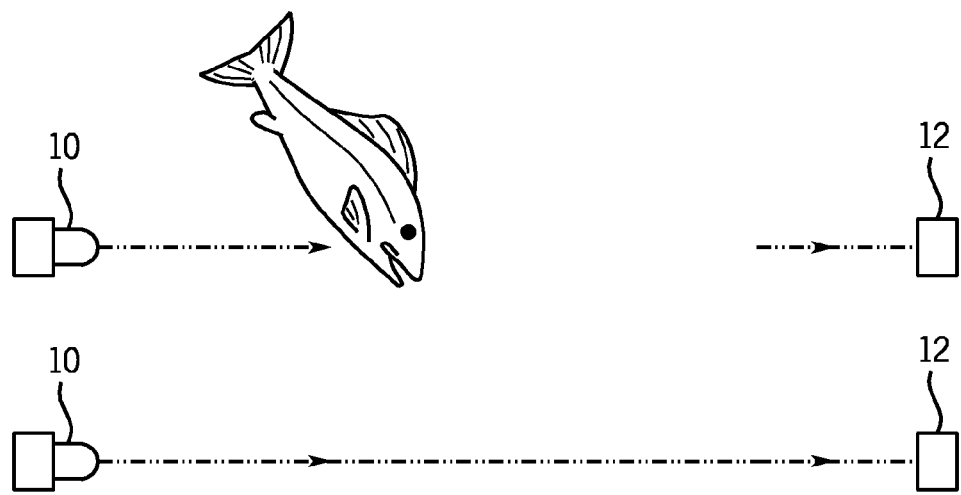
FIG. 2 shows a side cut-away view of a fish, used as an example, interrupting a light beam generated by the counter.

The light detector (12) is a photodiode or photoelectric sensor that receives the light from the light source (10). When an object passes through the monitored area, the light is interrupted and the changed is detected. FIG. 2 is a side cut-away view of a fish, used as an example, interrupting the light beam. The passage of an object through the monitored area, as represented from the side in FIG. 2, will change the amount of light moving from the light source (10) to the light detector (12). The change in amount of light received by the light detector (12) is in turned received by the electronic circuit. In one embodiment in FIG. 5, fiber optic strands (28) are used so that the light can be directed from the light source (10) to (a) desired location(s) without the need to have multiple light detectors or to allow the light detector (12) to be placed in a more secured part of the housing. In another embodiment in FIG. 6, the light source (10) and light detector (12) are placed in close proximity and a reflective surface (30) on the container or frame bounces the light from the light source (10) back to the light detector (12). This would allow a more consolidated electronic package.

The electronic counting circuit is any electronic circuit capable to monitoring the light detector for changes, adding one to a count retained in memory when the pre-defined change occurs. There are many circuits know to the art that are capable of this function. In addition to the basic counting circuit, additional electronic features are included in other embodiments to enhance the basic functioning of the counter. These might include, but are not limited to, long-term storage memory like various magnetic memory media know to the art. This combined with a clock and calendar circuit would allow on ongoing record of objects caught from day to day. In addition, it is desirable that the electronic circuit be able to retain a count despite the removal of the power supply.

Figure 3:
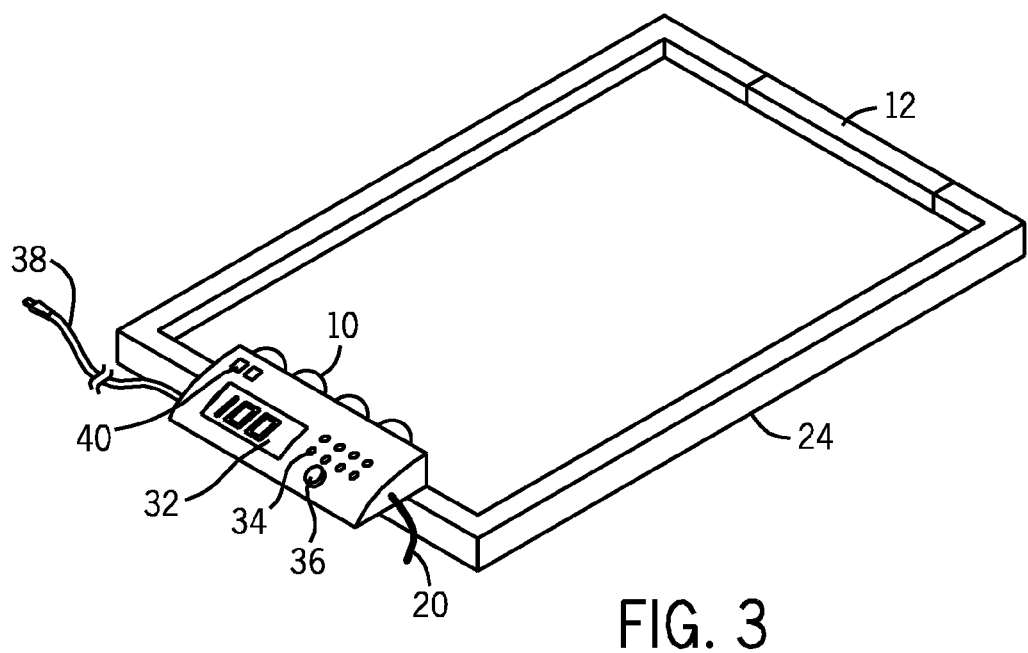
FIG. 3 shows an embodiment of the counter having a communication center and cable for external power.

FIG. 3 shows an embodiment of the counter mounted on a frame (24). The light source (10) and light detector (12) are positioned on the inside edge of the frame (24). A liquid crystal or LED visual display (32) communicates the count allowing a person to see a number indicating the number of items that have been placed in a container. In addition to a visual display (32), other ways of communicating the count may be desirable. For example, a speaker (34) may be provided to allow the use of synthetic human voice, or an audible series of tones may be used. Also, wireless and infrared communication (36) would allow electronic devices to receive the information, allowing for the integration of commonly used electronic devices like sonar or GPS. A data cable (38) may also be provided to allow wired communication with such electronic devices. A button (40) would also be provided to restart the count or to correct any errors in the count or allow removal of an object from the container. An external power source may be connected using a power cable (20).

The internal electric power source is any compact and portable battery, fuel cell, generator, or capacitor that is capable to supplying electrical energy to the device. Preferably, this would be a pre-charged chemical battery. However, in the embodiment of the device that allows for an external power source, an internal electric power source could be omitted or could be charged so as to allow disconnection from the external power source.

The external power source could either serve as the only power source for the device or could charge or supplement the device's internal electrical power source. A common example would be a 12-Volt battery available on many cars and fishing boats. Alternative external powers supplies include, but are not limited to, solar panels, household alternating currents, accessory plugs on vehicles, and wind turbines. Some of external power sources could also be integrated into the container along with the device, solar for instance, to serve to extend the power of the internal power source.

Figure 4:
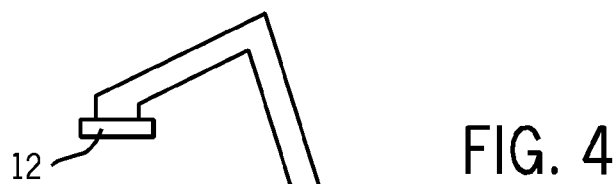
FIG. 4 shows a cut-away view of the essential electronic elements of the counter.
Figure 5:
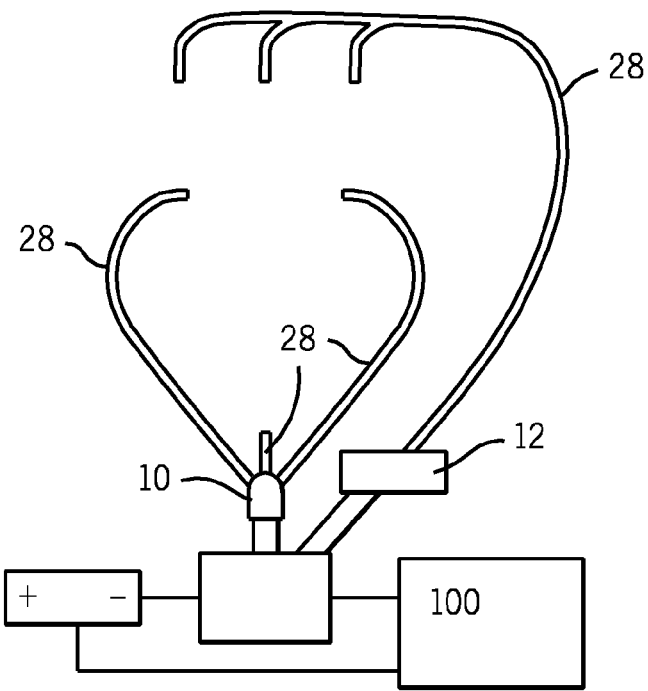
FIG. 5 shows an alternative embodiment of the counter having a cut-away view of the essential electronic elements of the counter including fiber optic strands to both transmit light from the light source and receive light and transmit it to the light detector.
Figure 6:
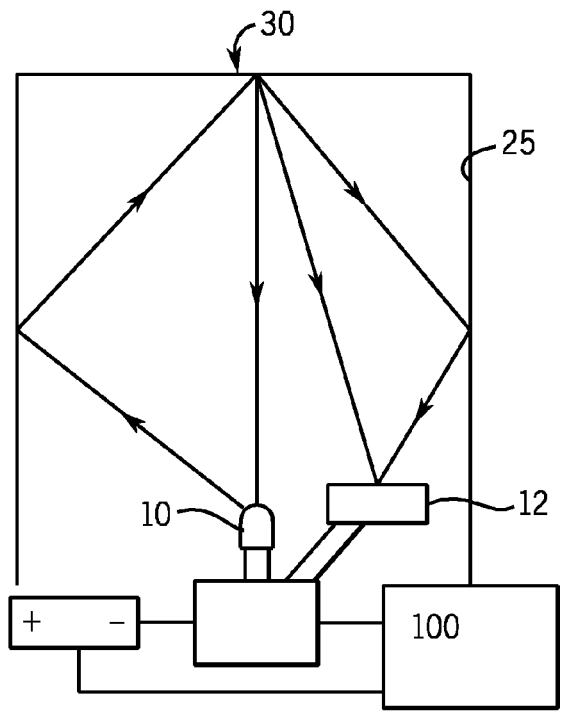
FIG. 6 is a cut-away view of the essential electronic elements of another alternative embodiment of the counter having the light source and light detector in close proximity to one another and a mirror or reflective inner surface of the container or frame.

FIG. 4 is a cut-away view of the relationships between essential electronic elements of the device in its preferred embodiment. The power source (18) powers both the light source (10) and the electronic circuit (16). The electronic circuit (16) monitors the light detector (12) and keeps track of the count. In FIG. 5, the essential electronic elements of the device in an alternative embodiment include fiber optic strands (28) to both transmit light from the light source (10) and receive light and transmit it to the light detector (12). This allows either the light detector (12) or the light source (10) or both to remain closer to the main electrical circuit (16). In FIG. 6, another alternative embodiment places the light source (10) and light detector (12) in close proximity to one another. In this embodiment, mirrored or reflective materials would be used on the inner edge (25) of the container or frame so as to bounce the light from the light source (10) back to the light detector (12).

The housing is an enclosure for the components of the counter. It is made of a rigid plastic, metal or similar material. It is designed to protect the components from water, sand and other damaging elements. It also serves to secure the components in their positions within the device and to present the user with a simple interface. The housing would allow access for replacement of batteries or similar internal power supply. Depending on the particular embodiment, the housing may have openings for a communication cable, a speaker, an infrared port, and an external power supply.

The flexible cable is a bendable protective sheath that protects electronic or fiber optic elements. The bendable protective sheath would be made of a plastic, rubber or similar material. An additional conduit shield may be added to increase the durability of the cable. The length of the flexible cable would limit the distance between the light detector and the remainder of the device to ensure the device can operate effectively. The flexible cable would be positioned outside of the opening of the container to ensure it would not interfere with the fall of anything placed in the container.

Figure 7:
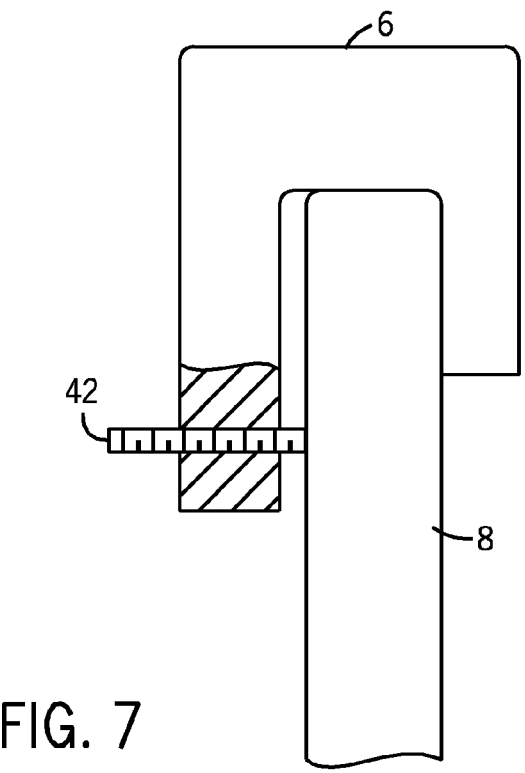
FIG. 7 is a cut-away view from the side of the housing for the counter as it would be held to the container using a screw-based clamp.

FIG. 7 shows a clamp (42) being used to create a stable connection between the counter (6) and a container (8) such as a cooler. The stable connection also may be accomplished by molding the housings for the light detector directly into a frame or shaping the housing to snap into place or fit snugly over the edge of the container. Other securing devices, such as or by using springs based clamps, adhesives, or screws that would enter the material of the container (8), may be used.

Figure 8:
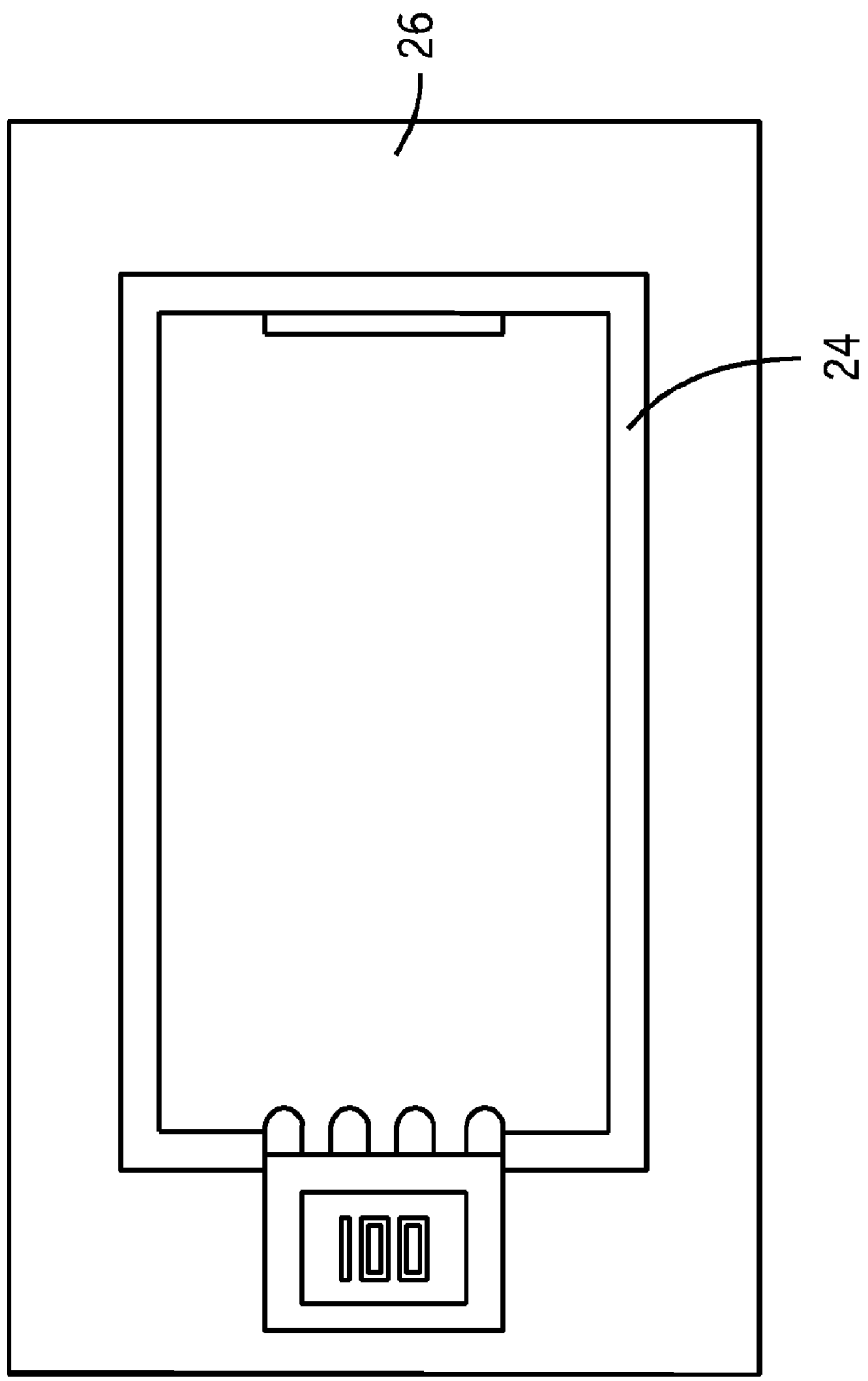
FIG. 8 is a view of the counter as it might be integrated into a flat sheet such as the lid of an insulated cooler container.

FIG. 8 shows an alternative embodiment with the opening defined by frame (24) integrated into a flat sheet (26) of rigid waterproof material such as plastic.

I claim:

1. A portable fish and game counter consisting of:

an optical counter consisting of: a diode light source, a light detector aligned with the light source at a distance from the light source that is determined at each time of use, and an electronic counting circuit that retains a count in memory and is in electronic communication with the light detector;

a water-proof housing containing the electronic counting circuit;

a numeric visual display positioned on an outer surface of the water-proof housing and in electronic communication with the electronic counting circuit;

a user accessible count adjustment button in electronic communication with the electronic counting circuit;

a flexible cable connecting the light detector and the electronic counting circuit;

a first detachable securing mechanism secured to the diode light source; and, a second detachable securing mechanism secured to the light detector, wherein the diode light source temporarily attaches to a container with the first detachable securing mechanism and the light detector temporarily attaches to the container with the second securing mechanism in a position that aligns the light detector with the diode light source at a distance from the light source that is determined by a diameter of an aperture in the container selected for that time of use, wherein, the portable fish and game counter may be removed from the selected container and disassembled, and reassembled and attached to a different container without the loss of count data.

2. A portable fish and game counter comprising:

an optical counter consisting of: a diode light source, a light detector that detects light from the diode light source in ambient light conditions, and an electronic counting circuit that retains a count in memory and is in electronic communication with the light detector, wherein the light detector is aligned with the light source at a distance determined at each time of use;

a water-proof housing containing the electronic counting circuit;

a numeric visual display positioned on an outer surface of the water-proof housing and in electronic communication with the electronic counting circuit;

a user accessible count adjustment button in electronic communication with the electronic counting circuit;

a flexible cable connecting the light detector and the electronic counting circuit;

a first detachable securing mechanism secured to the diode light source; and, a second detachable securing mechanism secured to the light detector, wherein the diode light source temporarily attaches to a container with the first detachable securing mechanism and the light detector temporarily attaches to the container with the second securing mechanism in a position that aligns the light detector with the diode light source at a distance from the light source that is determined by a diameter of an aperture in the container selected for that time of use, wherein, the portable fish and game counter may be removed from the selected container and disassembled, and reassembled and attached to a different container without the loss of count data.

3. The portable fish and game counter of claim 2, further comprising a form of long-term storage memory.

4. The long-term storage memory of claim 3, wherein the long-term storage memory is combined with a clock and calendar circuit for ongoing records of day to day counts.

5. The portable fish and game counter of claim 2, further comprising a means of wireless communication.

6. The portable fish and game counter of claim 2, further comprising a data cable in electronic communication between the electronic counting circuit and an external electronic device.

7. The portable fish and game counter of claim 2, further comprising a means of infrared communication.

* * * * *